Oct. 14, 1930.    J. P. M. MALLEVILLE    1,778,504
UNIVERSAL CLAMPING SCREW COLLAR
Filed March 1, 1929

Inventor
Jean Paul Marie Malleville
By B. Singer, Atty.

Patented Oct. 14, 1930

1,778,504

UNITED STATES PATENT OFFICE

JEAN PAUL MARIE MALLEVILLE, OF PARIS, FRANCE

UNIVERSAL CLAMPING-SCREW COLLAR

Application filed March 1, 1929, Serial No. 343,663, and in France March 3, 1928.

The present invention relates to improvements in universal clamping screw-collars employing a non-perforated band, one of the objects being to provide an improved clamping screw collar in which the head carrying the screw-nut forms a special part and is not punched with the band nor provided with any embossed or pressed part, nor rib or any other reinforcement rendering the head rigid; on the contrary, this head-part is sufficiently yielding so as to adapt itself to the shape of the tube and its width is sufficient to constitute a broad surface bearing upon the tube, this arrangement permitting an energetic clamping of the screw without danger of distortion of the piece constituting the head and without being obliged to fix this head in any manner during the tightening of the screw.

An aperture is provided in the head for the passage of both extremities of the clamping band.

One of the extremities of the band, the movable end, is attached once for ever to the end of the screw, while the other band-extremity is simply folded out- or inwardly after its passage through the said aperture and maintained in this position by the movable end of the band covering it when tightening the screw and impeding its involuntary getting up.

In order to realize an effective attachment of the movable end of the band, this end is folded around a small plate or the like fitted freely at the end of the screw, whereby the terminal perforated part of the band is alleviated with regard to the pull exerted upon the not perforated (and hence not weakened) parts of the band.

The invention will be better understood by reference to the accompanying drawings showing, in the way of examples some embodiments possible. In the drawings.

The head T of the band, rectangular or otherwise shaped, consists of a flat, not pressed plate of sufficient softness to permit its bending according to the curvature of the tube or the like, upon which this head is bearing, and the width of this head ought to be sufficient to avoid weakening by the apertures O provided for the passage of the extremities $b_1$ $b_2$ of the band B, and to afford at the same time a large bearing surface applied to the tube.

The head T carries a nut E independently, the screw V turning in this nut and presenting at one end a smooth extremity or a stud C riveted eventually and serving for attachment of the movable extremity $b_2$ of the band.

Figure 1:
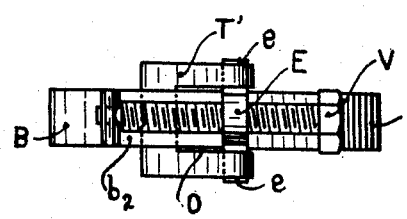
Figure 3:
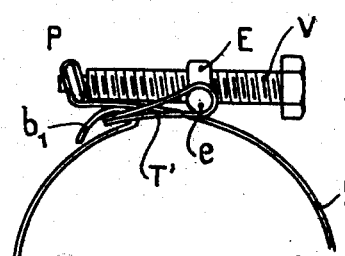
Fig. 3 is an elevation of the collar, after clamping.

In order to effect clamping, the working will be as follows:

After having surrounded the part to be clamped, such as a tube or the like, by the band B attached with its extremity $b_2$ as above specified, the other extremity $b_1$ of this band is led through the window O and thereupon backwardly bent, as represented in Fig. 1, outwardly or inwardly. Clamping is thereupon effected by turning the screw V, whereby a pull is exerted upon the movable extremity $b_2$ folded previously, and preventing its undue raising (Fig. 3).

Even if the extremity $b_1$ were not completely folded, this folding is secured automatically as soon as the screw is tightened, owing to the advance of the extremity $b_2$, this advance flattening downwardly the extremity $b_1$.

When tightening the screw V, the head T (Fig. 3) curves itself so as to follow the curvature of the tube supporting this head; this may not result into torsion-effects upon the screw V, because the nut E is independent and freely pivoting with regard to the head T so as to permit the screw V to occupy, when clamping, its normal position of equilibrium without undergoing torsional efforts.

The head T is formed by a rectangular plate T' folded around pivots $e$ of an independent nut E.

It is preferable to fold the free extremity $b_2$ around a small plate P fitted freely (by riveting or otherwise) upon the stud C of the screw so as to remain there in fixed position during the rotation of the screw.

Figure 4:
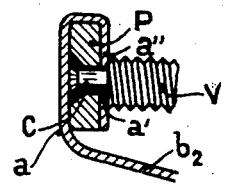
Fig. 4 is a detail section of the clamping screw and the means for connecting the same to the free extremity of the band.
Figure 2:
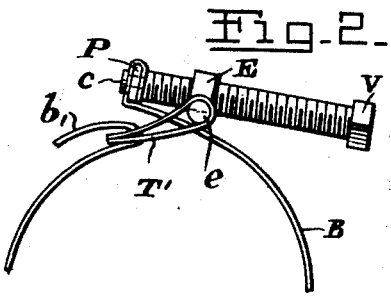
Figs. 1 and 2 represent in plan view and elevation respectively an executional mode of a collar (previous to complete clamping)

In order to prevent weakening of the band in case of its being very narrow, the fitting can be effected as represented in Fig. 4, hence without the extremity of the screw traversing a second time the part $a$ of the band, situated outwardly.

In this way the traction effort is not supported by the weakened part $a'$ of the band, but by the not perforated parts $a''$—$a$ of the band.

It goes without saying that the invention is not limited to the shown and described embodiments and the most manifold modifications are possible both with regard to the general arrangement as with regard to details without departing from the scope of the main inventional idea.

What I claim is:

1. In universal clamping screw-collars, a band of uniform entire section surrounding the body to be clamped, a folded extremity of said band, a metal plate between said folds, a screw attached to said metal piece, a flat yielding metal piece, an aperture therein, a nut, lateral projections thereon to permit folding around the same of said metal piece, said nut receiving said screw, and the said extremity of the band passing through said aperture and the other extremity of said band being folded around a border of said aperture.

2. In universal clamping screw-collars, a clamping band of uniform entire section, a yielding metal piece, a central rectangular aperture therein, a nut, projections thereon to permit folding around of said metal piece, the passage of one extremity, folded around one border of said aperture, the other extremity passing equally through said aperture, carrying a cap destined to receive the screw of said nut.

3. A clamp of the class described, comprising a plate having an opening therein, a flexible band having its ends extended through said opening, one of said ends being bent to form a hook whereby to attach said end to said plate and the other end being of inverted U-shape, a plate in said U-shaped end of the band, a nut pivotally connected to the first named plate and a screw threaded in said nut and having one end swivelly connected to the U-shaped end of the band and to the second named plate.

In witness whereof I affix my signature.

JEAN PAUL MARIE MALLEVILLE.